(12) United States Patent
Chan

(10) Patent No.: US 7,570,003 B2
(45) Date of Patent: Aug. 4, 2009

(54) AUTOMATIC OPENING GARBAGE CAN

(75) Inventor: Chi Tau Chan, Thornhill (CA)

(73) Assignee: Euro-Pro Operating, LLC, West Newton, MA (US)

( * ) Notice: Subject to any disclaimer, the term of this patent is extended or adjusted under 35 U.S.C. 154(b) by 696 days.

(21) Appl. No.: 11/080,287

(22) Filed: Mar. 14, 2005

(65) Prior Publication Data

US 2006/0214620 A1    Sep. 28, 2006

(51) Int. Cl.
*H02P 1/04* (2006.01)
(52) U.S. Cl. .................. 318/480; 318/466; 318/286; 318/16
(58) Field of Classification Search .......... 318/480, 318/466, 468, 558, 283, 285, 286, 16, 164, 318/265, 266, 267
See application file for complete search history.

(56) References Cited

U.S. PATENT DOCUMENTS 5,932,982 A * 8/1999 Pezzelli, Jr. ............. 318/480

| 6,150,939 | A | * | 11/2000 | Lin ................. 340/568.1 |
| 6,519,130 | B1 | * | 2/2003 | Breslow ............... 361/170 |
| 7,256,694 | B2 | * | 8/2007 | Papari et al. .......... 340/565 |
| 2004/0174268 | A1 | * | 9/2004 | Scott et al. ........... 340/686.6 |
| 2004/0257020 | A1 | * | 12/2004 | Boliver ................ 318/480 |
| 2005/0230572 | A1 | * | 10/2005 | Fisher ................. 248/97 |

* cited by examiner

*Primary Examiner*—Bentsu Ro
*Assistant Examiner*—Thai Dinh
(74) *Attorney, Agent, or Firm*—McCarter & English, LLP; Michael I. Wolfson

(57) ABSTRACT

A lid assembly for use with a garbage can having a frame that includes a lip at the bottom of lid and a housing. The housing is defined by a lower wall and a sidewall with an opening. A static electricity sensor is positioned in the housing. The lid assembly also includes a displaceable door that moves with the lip to open the garbage can. So that when the static electricity sensor detects the static electricity of a user, the displaceable door slides to open the garbage can and when the static electricity sensor does not detects the static electricity of a user, the displaceable door slides to close the garbage can.

4 Claims, 6 Drawing Sheets

AUTOMATIC OPENING GARBAGE CAN

BACKGROUND OF THE INVENTION

The invention relates generally to a garbage can, and more particularly to a garbage can with a door and sensor that detects static electricity in the human body to open the door without a user touching the garbage can. When the detection signal is withdrawn, garbage can door automatically closes.

Garbage cans are commonly known and used around the world. There are garbage cans known in the art that try to minimize the user's contact with the garbage can to prevent the spread of germs to the user. For example, there are garbage cans where a user steps on a pedal to open the lid of the garbage can hands free. Also, known in the art are infrared operated garbage cans, where the garbage can lid opens when a hand or debris enters the light beam. However, this type of garbage can must have an electric cord that must be plugged in or have a battery supply that is being constantly drain regardless of user status to stay functional.

Notwithstanding the wide variety of garbage cans available, there exists the need to provide continued improvements and alternative designs to improve garbage cans that are economical to use, simple in design and easy for the user to operate.

SUMMARY OF THE INVENTION

Generally speaking, in accordance with the invention, a garbage can lid assembly that includes an openable lid and static electricity sensor is provided. The lid assembly has a frame that includes a lip at the bottom and a housing to hold a static electricity sensor. The housing is defined by a lower wall and a sidewall with an opening and when the lid opens access to a garbage can is provided. In a preferred embodiment, the lid assembly also includes a sliding door that slides in a circular motion around the partial circumference of the lip to open the garbage can lid. When the static electricity sensor detects the static electricity of a user, the sliding door slides to open the garbage can and when the static electricity sensor does not detects the static electricity in a user, the sliding door slides to close the garbage can.

Accordingly, it is an object of the invention to provide an improved lid for use with a garbage can.

Another object of the invention is to provide an improved garbage can having a housing and a lid, where the lid includes a static electricity sensor.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawing(s), in which.

DETAILED DESCRIPTION OF THE INVENTION

Figure 1:
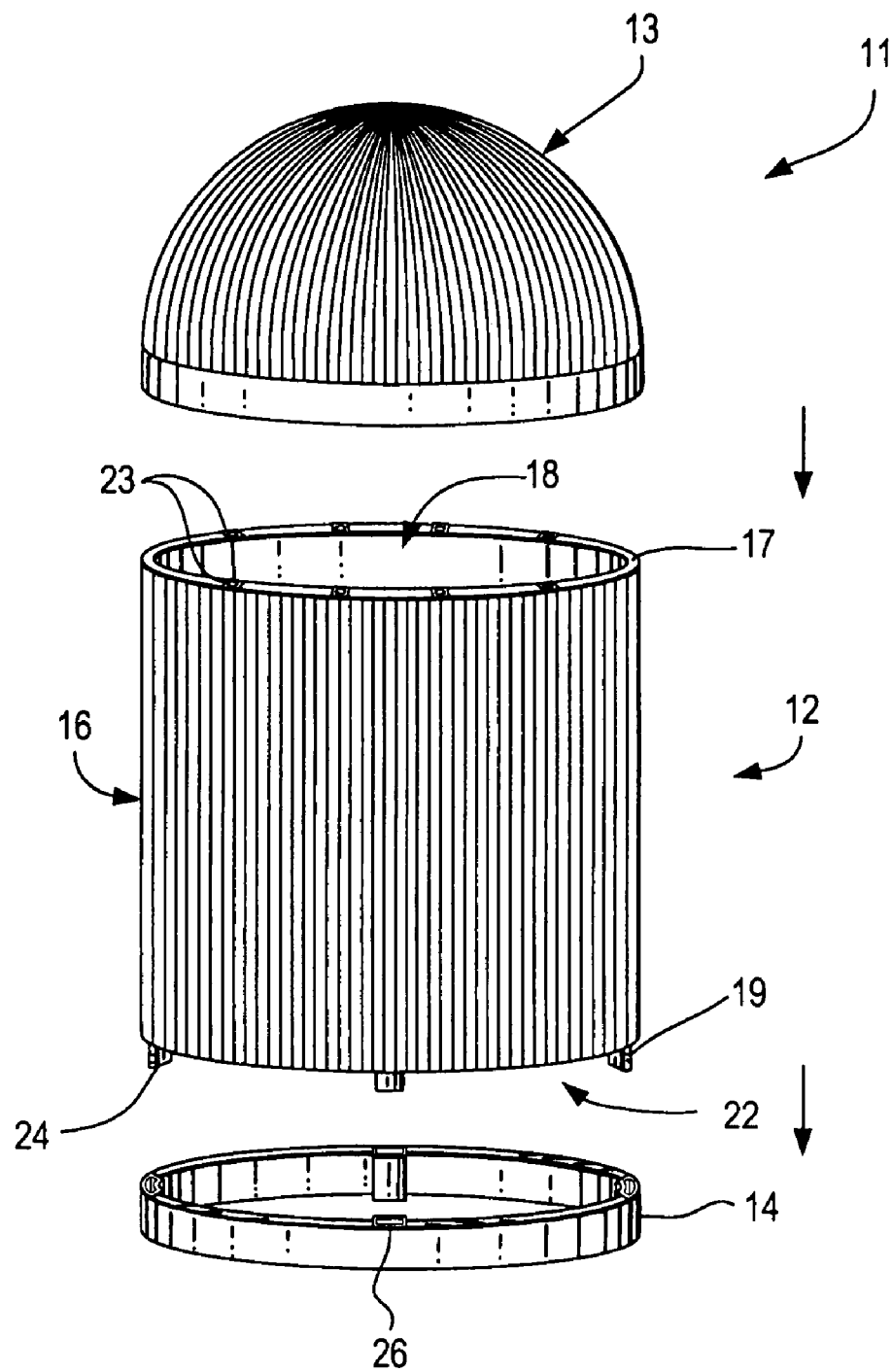
FIG. 1 is an exploded perspective view of a garbage can including a lid assembly constructed and arranged in accordance with the invention.
Figure 2:
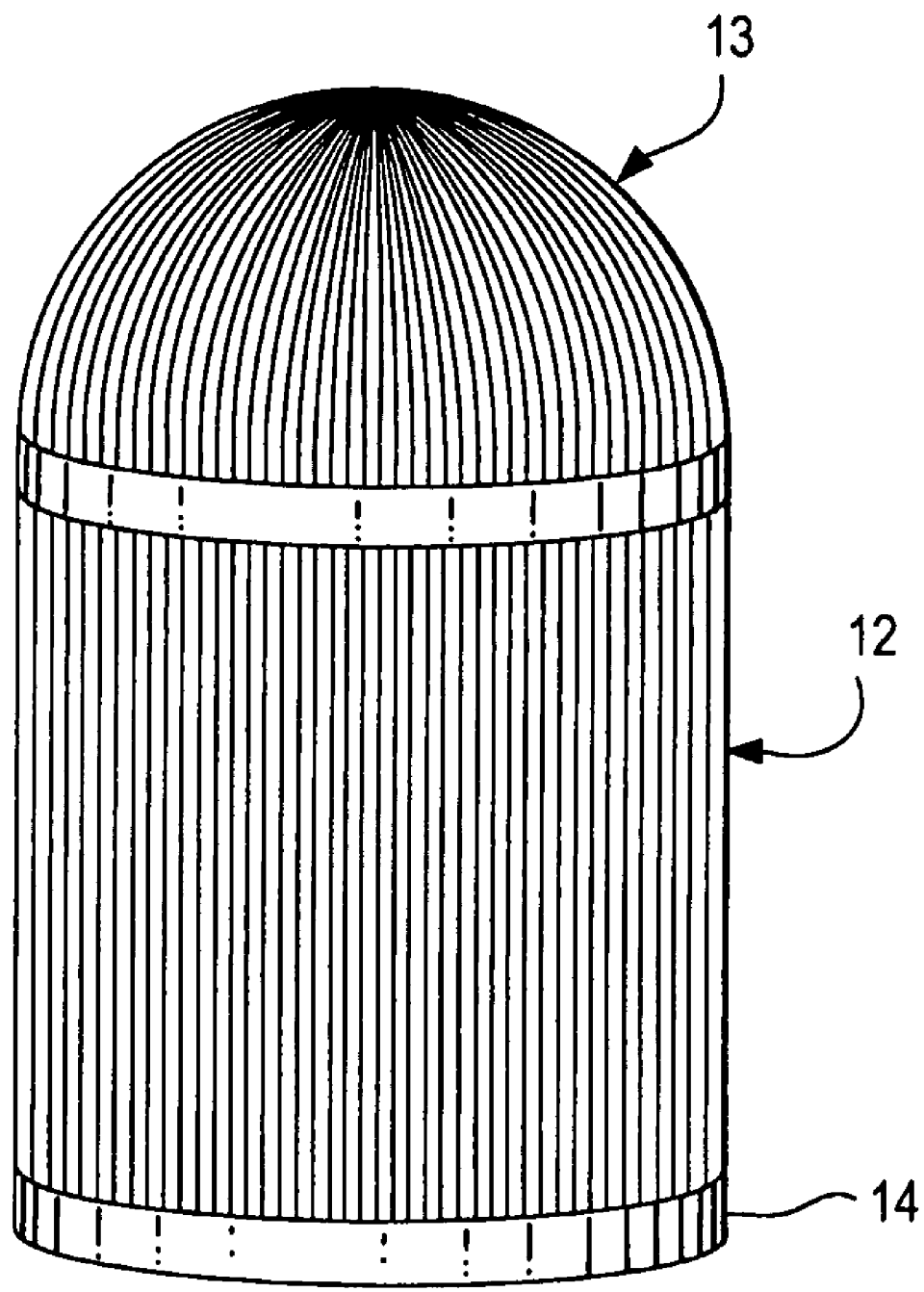
FIG. 2 is an perspective view of the assembled garbage can of FIG. 1 showing how the garbage can lid assembly fits on the body of the garbage can.

FIG. 1 is an exploded perspective view of a garbage can 11 including a housing 12 with a lid assembly 13 having a static electricity sensor 21 (shown in FIG. 6) and a base 14. Housing 12 includes a sidewall 16 that terminates at an upper lip 17 to define an open top 18 at one end and terminates at a lower lip 19 to define an open bottom 22 at the opposite end. Open top 18 includes a plurality of tabs 23 around the periphery of upper lip 17 for receiving and supporting lid assembly 13 in place. Open bottom 22 includes a plurality of tabs 24 around the periphery of lower lip 19 that mates with corresponding cavities 26 on base 14. Accordingly, base 14 is securely fitted to lower lip 19 of sidewall 16. FIG. 2 shows garbage can 11 as assembled.

In another embodiment, housing 12 of garbage can 11 has a sidewall 16 that terminates at an upper lip 17 to define an open top 18 at one end and closed bottom to form an integrally formed base and sidewall.

Figure 3:
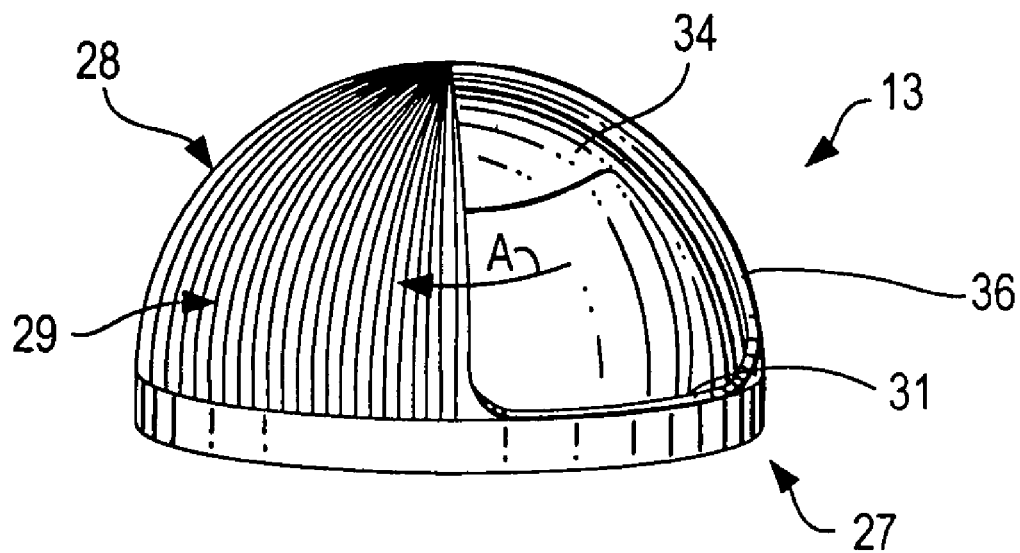
FIG. 3 is a perspective view of the garbage can lid assembly of FIGS. 1 and 2 with the lid in a partially opened position.
Figure 4:
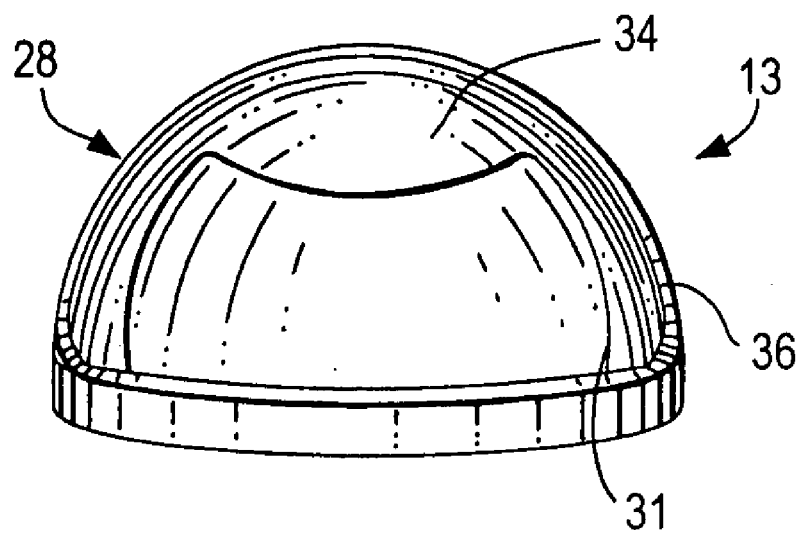
FIG. 4 is a perspective view of the garbage can lid assembly of FIGS. 1 and 2 with the lid in the fully opened position.

As shown in FIGS. 3 and 4, lid assembly 13 has a frame 27 that includes a stationary half lid 28 and a displaceable half lid or sliding door 29 that is opened in response to a signal generated when static electricity of a user is detected. Frame 27 includes a lip 31 around the circumference of lid assembly 13 and a housing 32 that houses static electricity sensor 21 (see FIG. 5). Housing 32 is defined by stationary half lid 28 that runs from the top of lid assembly 13 to lip 31, lower wall 33 (see FIG. 5) that is perpendicular to the circumference of lip 31 and a sidewall 34 that extends from lower wall 33 almost to the top of stationary half lid 28. An area 36 in between the stationary half lid 28 and around the top of sidewall 34 houses sliding door 29 when garbage can 11 is opened.

Sliding door 29 opens by sliding in a circular motion around the partial circumference of lip 31 of lid assembly 13 as shown by an arrow A in FIG. 3. Once garbage can 11 is fully opened, sliding door 29 is hidden parallel to stationary half lid 28 in an area 36. Accordingly, when static electricity sensor 21 detects the static electricity in the human body, such as a human hand, sliding door 29 automatically opens by sliding around the partial circumference of lip 31 and is hidden in area 36 parallel to stationary half lid 28 without the user touching garbage can 11. When static electricity sensor 21 detects that the human body is moving away from garbage can 11, sliding door 29 automatically closes and returns to the closed position.

Figure 5:
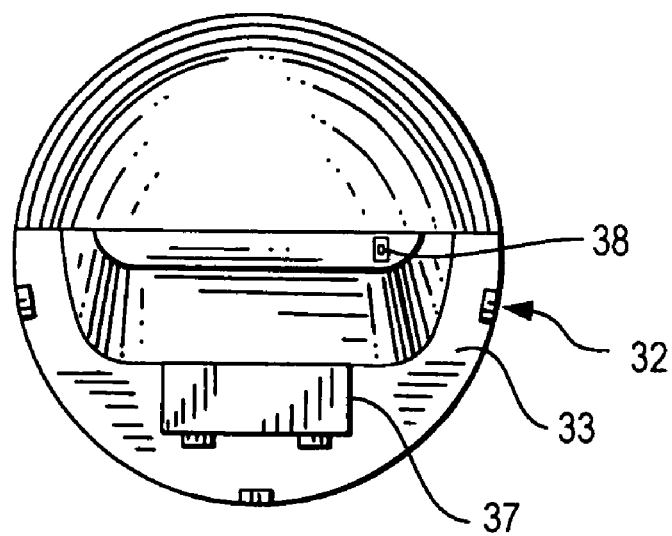
FIG. 5 is a bottom view of the garbage can lid assembly of FIGS. 1 and 2.

FIG. 5 is a bottom view of the garbage can lid assembly 13. Lower wall 33 of housing 32 includes an opening for a battery door 37. Also, there is a power switch 39 located in sidewall 34 of housing 32 for ease of use.

Figure 6:
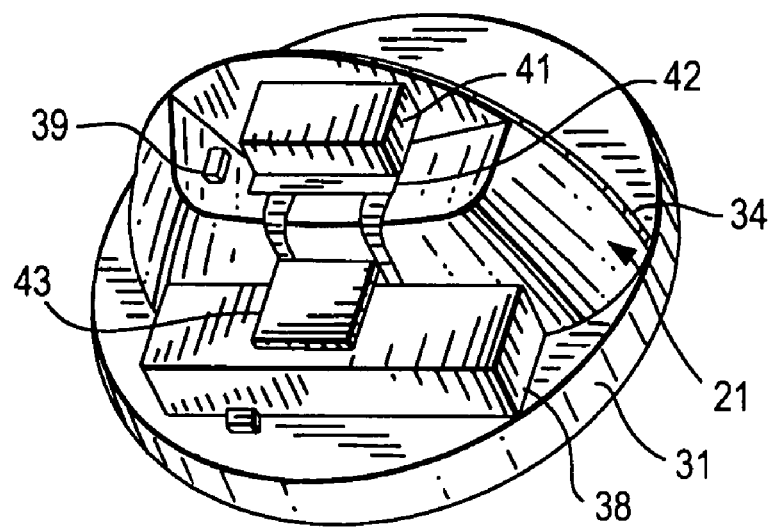
FIG. 6 is a top cross-sectional view of the garbage can lid assembly of FIGS. 1 and 2.

FIG. 6 is a top cross-sectional view of garbage can lid assembly 13. Here, static electricity sensor 21 is contained on lower wall 33 of housing 32. A control board 43 is attached to a battery housing 38 to hold a battery or batteries. Control board 43 is electrically connected to power switch 39, battery housing 38 and gear boxes 41 and 42.

Figure 7:
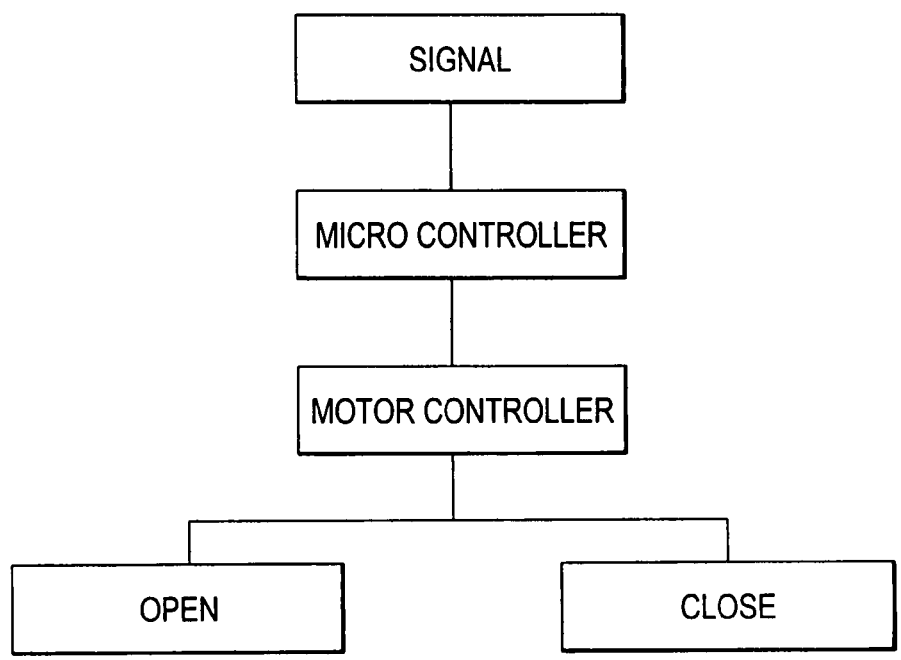
FIG. 7 is a flow chart of the static electricity sensor used in the garbage can lid assembly in accordance with the invention.

FIG. 7 shows a flow chart of the static electricity sensor used in the garbage can lid for the present invention. Here, a signal to a micro-controller is generated by an antenna (not shown). Micro-controller then reads the signal to determine if the garbage can lid is opened or closed and sends the appropriate signal to the motor controller. Motor controller then sends a current to the garbage can lid to execute whether to open or close the garbage can lid. The programmed parameters of the micro-controller, such as detection range may vary depending on the needs of the user. The detection range may be from about 5 cm to about 15 cm. More preferably, the detection range is about 10 cm. Accordingly, if the static electricity of a user is sensed, the garbage can lid will automatically open. If the user moves away from the garbage can so that static electricity of the user is not sensed, the garbage can lid will automatically close.

Figure 8:
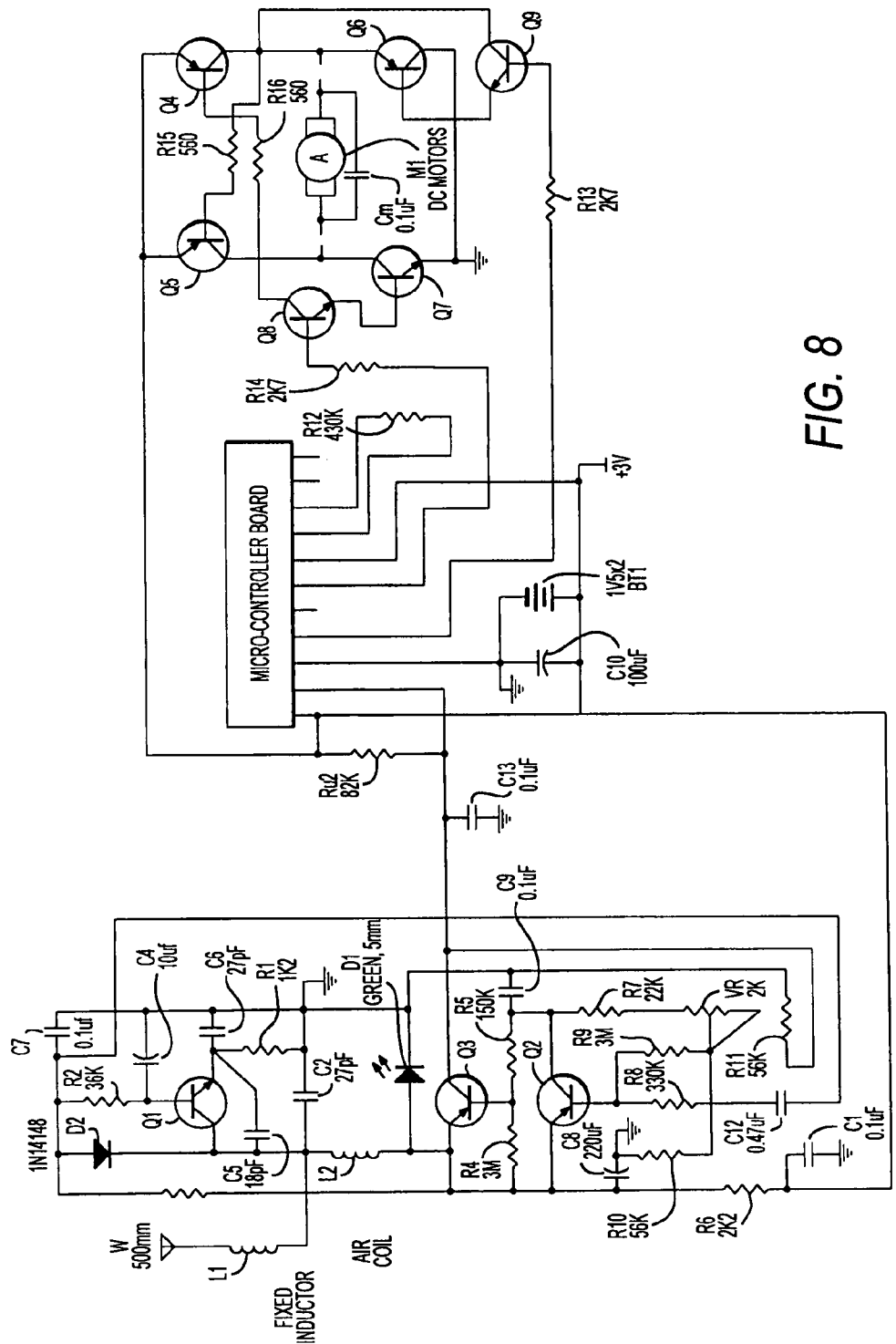
FIG. 8 is an exemplary circuit of the flow chart of FIG. 7 in accordance with the invention.

FIG. 8 is an exemplary circuit of the flow chart of FIG. 7 for the static electricity sensor used in the garbage can lid for the invention.

The benefits of the automatic garbage can lid opening are many. It allows access to the garbage can without touching the door so that the user's hands are not contaminated by the garbage can contents. If both hands are occupied, the lid is easily opened to allow access.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween The present invention may be embodied in other specific forms without departing from the spirit or essential attributes of the invention. Accordingly, reference should be made to the appended claims, rather than the foregoing specification, as indicating the scope of the invention.

What is claimed is:

1. A garbage can including an automatic opening lid assembly, comprising:
    a cylindrical garbage can housing having a cylindrical sidewall with at an upper lip to define an open top at one end and an open bottom;
    a base that mates with the open bottom to securely fit to the sidewall of the garbage can housing; and
    a lid assembly having a spherical lid frame that includes a lip at the bottom and a lid housing defined by a lower wall and a spherical sidewall with a stationary half and an opening;
    a displaceable spherical moveable door that moves within the lip between the lid housing and the spherical stationary half to open the garbage can; and
    a static electricity sensor positioned in the lid housing;
    wherein when the static electricity sensor detects the static electricity of a user, the spherical door rotates into the space between the lid housing and stationary half to open the garbage can and when the static electricity sensor does not detects the static electricity of a user, the displaceable door slides to close the garbage can;
    wherein the spherical lid is securely seated on the upper lip of the sidewall of the garbage can housing.

2. The garbage can of claim 1, wherein the housing of the lid assembly further includes a battery housing for holding batteries.

3. The garbage can of claim 1, wherein the static electricity sensor has a detection range from about 5 cm to about 15 cm.

4. The garbage can of claim 1, wherein the static electricity sensor has a detection range of 10 cm.

* * * * *